(12) United States Patent
Liu et al.

(10) Patent No.: US 12,136,416 B1
(45) Date of Patent: Nov. 5, 2024

(54) PRIVATE LANGUAGE MODEL ADAPTATION FOR SPEECH RECOGNITION

(71) Applicant: Meta Platforms, Inc., Menlo Park, CA (US)

(72) Inventors: Zhe Liu, Sunnyvale, CA (US); Ke Li, Baltimore, MD (US); Fuchun Peng, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 201 days.

(21) Appl. No.: 17/857,384

(22) Filed: Jul. 5, 2022

Related U.S. Application Data

(60) Provisional application No. 63/249,159, filed on Sep. 28, 2021.

(51) Int. Cl.
| | | |
|---|---|---|
| *G10L 15/16* | (2006.01) | |
| *G10L 15/06* | (2013.01) | |
| *G10L 15/30* | (2013.01) | |
| *G10L 15/32* | (2013.01) | |

(52) U.S. Cl.
CPC .......... *G10L 15/16* (2013.01); *G10L 15/063* (2013.01); *G10L 15/30* (2013.01); *G10L 15/32* (2013.01)

(58) Field of Classification Search
CPC ....... G10L 15/16; G10L 15/063; G10L 15/30; G10L 15/32
See application file for complete search history.

(56) References Cited

U.S. PATENT DOCUMENTS

| | | | | |
|---|---|---|---|---|
| 2009/0198493 | A1* | 8/2009 | Hakkani-Tur | G10L 15/18 704/235 |
| 2011/0144986 | A1* | 6/2011 | Yu | G10L 15/01 704/255 |
| 2015/0066503 | A1* | 3/2015 | Achituv | G10L 15/197 704/235 |
| 2018/0068653 | A1* | 3/2018 | Trawick | G10L 15/16 |
| 2021/0233518 | A1* | 7/2021 | Li | G06N 3/08 |
| 2022/0005464 | A1* | 1/2022 | Shen | G06N 3/044 |
| 2022/0270597 | A1* | 8/2022 | Qiu | G10L 15/22 |
| 2022/0310080 | A1* | 9/2022 | Qiu | G10L 15/02 |

(Continued)

OTHER PUBLICATIONS

Nakano, Mikio, and Timothy J. Hazen. "Using untranscribed user utterances for improving language models based on confidence scoring." Interspeech. 2003. (Year: 2003).*

(Continued)

*Primary Examiner* — Brian L Albertalli
(74) *Attorney, Agent, or Firm* — BakerHostetler

(57) ABSTRACT

In one embodiment, a method includes accessing a decoded hypothesis corresponding to an utterance, computing a predicted probability of observing each token in the decoded hypothesis by having a local first machine-learning model process the decoded hypothesis, computing a confidence score for each token in the decoded hypothesis by having a second machine-learning model process the decoded hypothesis, where the confidence score indicates a degree of confidence for the token to be observed at its position, calculating a loss for the computed predicted probabilities of observing tokens in the decoded hypothesis based on the computed confidence scores, and updating parameters of the local first machine-learning model based on the calculated loss.

20 Claims, 6 Drawing Sheets

(56) References Cited

U.S. PATENT DOCUMENTS

2024/0127796 A1* 4/2024 Sato .................. G10L 15/16

OTHER PUBLICATIONS

Haznedaroglu, Ali, and Levent M. Arslan. "Language model adaptation for automatic call transcription." 2014 IEEE International Conference on Acoustics, Speech and Signal Processing (ICASSP). IEEE, 2014. (Year: 2014).*
Malhotra, Karan, Shubham Bansal, and Sriram Ganapathy. "Active Learning Methods for Low Resource End-to-End Speech Recognition." Interspeech. 2019. (Year: 2019).*
Egorova, Ekaterina, and Jordi Luque Serrano. "Semi-supervised training of language model on spanish conversational telephone speech data." Procedia Computer Science 81 (2016): 114-120. (Year: 2016).*
Novotney, Scott, Richard Schwartz, and Sanjeev Khudanpur. "Getting more from automatic transcripts for semi-supervised language modeling." Computer Speech & Language 36 (2016): 93-109. (Year: 2016).*
Sudoh, Katsuhito, and Mikio Nakano. "Post-dialogue confidence scoring for unsupervised statistical language model training." Speech Communication 45.4 (2005): 387-400. (Year: 2005).*
Arnold K.C., et al., "On Suggesting Phrases vs. Predicting Words for Mobile Text Composition," Proceedings of the 29th Annual Symposium on User Interface Software and Technology, 2016, pp. 603-608.
Chan W., et al., "Listen, Attend and Spell: A Neural Network for Large Vocabulary Conversational Speech Recognition," IEEE International Conference on Acoustics, Speech and Signal Processing (ICASSP), 2016, pp. 4960-4964.
Chen F., et al., "Federated Meta-Learning with Fast Convergence and Efficient Communication," arXiv:1802.07876, 2018, 14 pages.
Chen X., et al., "Improving the Training and Evaluation Efficiency of Recurrent Neural Network Language Models," EEE International Conference on Acoustics, Speech and Signal Processing (ICASSP), 2015, pp. 5401-5405.
Cui X., et al., "Federated Acoustic Modeling for Automatic Speech Recognition," IEEE International Conference on Acoustics, Speech and Signal Processing (ICASSP), 2021, pp. 6748-6752.
Dimitriadis D., et al., "A Federated Approach in Training Acoustic Models," Interspeech, 2020, pp. 981-985.
Dwork C., et al., "Calibrating Noise to Sensitivity in Private Data Analysis," Theory of Cryptography Conference, 2006, pp. 265-284.
Dwork C., et al., "The Algorithmic Foundations of Differential Privacy," Foundations and Trends in Theoretical Computer Science, 2014, vol. 9, Nos. 3-4, pp. 211-407.
Graves A., et al., "Connectionist Temporal Classification: Labelling Unsegmented Sequence Data with Recurrent Neural Networks," In Proceedings of ICML, 2006, pp. 369-376.
Graves A., "Sequence Transduction with Recurrent Neural Networks," International Conference of Machine Learning (ICML), arXiv preprint arXiv:1211.3711, Nov. 14, 2012, 9 pages.
Guliani D., et al., "Training Speech Recognition Models with Federated Learning: A Quality/Cost Framework," IEEE International Conference on Acoustics, Speech and Signal Processing (ICASSP), 2021, pp. 3080-3084.
He Y., et al., "Streaming End-to-End Speech Recognition for Mobile Devices," IEEE International Conference on Acoustics, Speech and Signal Processing (ICASSP), 2019, pp. 6381-6385.
Huang P., et al., "Predicting Speech Recognition Confidence using Deep Learning with Word Identity and Score Features," IEEE International Conference on Acoustics, Speech and Signal Processing (ICASSP), 2013, pp. 7413-7417.
Irie K., et al., "Language Modeling with Deep Transformers," Interspeech, 2019, pp. 3905-3909.
Ji S., et al., "Learning Private Neural Language Modeling With Attentive Aggregation," International Joint Conference on Neural Networks (IJCNN), 2019, pp. 1-8.
Jiang H., "Confidence Measures for Speech Recognition: A Survey," Speech communication, Apr. 2005, vol. 45, No. 4, pp. 455-470.
Kalgaonkar K., et al., "Estimating Confidence Scores on ASR Results using Recurrent Neural Networks," IEEE International Conference on Acoustics, Speech and Signal Processing (ICASSP), 2015, pp. 4999-5003.
Kannan A., et al., "An Analysis of Incorporating an External Language Model Into a Sequence-to-Sequence Model," International Conference on Acoustics, Speech and Signal Processing (ICASSP), 2018, pp. 5824-5828.
Kim S., et al., "Improved Neural Language Model Fusion for Streaming Recurrent Neural Network Transducer," International Conference on Acoustics, Speech and Signal Processing (ICASSP), 2021, pp. 7333-7337.
Kim Y., et al., "Character-Aware Neural Language Models," Proceedings of the Thirtieth AAAI Conference on Artificial Intelligence [Online], Oct. 16, 2015 [Retrieved on Apr. 12, 2018], 9 Pages, XP055466626, Retrieved from the Internet: URL: https://arxiv.org/pdf/1508.06615.pdf.
Konecny J., et al., "Federated Learning: Strategies for Improving Communication Efficiency," NIPS Workshop on Private Multi-Party Machine Learning, 2016, 5 pages.
Konecny J., et al., "Federated Optimization: Distributed Machine Learning for On-Device Intelligence," arXiv:1610.02527, Oct. 2016, 38 pages.
Leroy D., et al., "Federated learning for keyword spotting," IEEE International Conference on Acoustics, Speech and Signal Processing (ICASSP), 2019, pp. 6341-6345.
Li K., et al., "A Parallelizable Lattice Rescoring Strategy with Neural Language Models," IEEE International Conference on Acoustics, Speech and Signal Processing (ICASSP), 2021, pp. 6518-6522.
Liu X., et al., "Efficient Lattice Rescoring using Recurrent Neural Network Language Models," IEEE International Conference on Acoustics, Speech and Signal Processing (ICASSP), 2014, pp. 4908-4912.
Liu Z., et al., "Private Language Model Adaptation for Speech Recognition," arXiv:2110.10026 [eess.AS], Sep. 28, 2021, 5 pages.
McMahan H. B., et al., "Learning Differentially Private Recurrent Language Models," International Conference on Learning Representations (ICLR), 2018, 14 pages.
McMahan H.B., et al., "Communication-Efficient Learning of Deep Networks from Decentralized Data," Proceedings of the 20th International Conference on Artificial Intelligence and Statistics (AISTATS), 2017, 10 pages.
Mikolov T., et al., "Recurrent Neural Network based Language Model," Interspeech, 2010, pp. 1045-1048.
Mironov I., "Renyi Differential Privacy," In 30th Computer Security Foundations Symposium (CSF), IEEE, 2017, pp. 263-275.
Reddi S.J., et al., "Adaptive Federated Optimization," International Conference on Learning Representations (ICLR), 2021, 38 pages.
Xu H., et al., "A Pruned RNNLM Lattice-Rescoring Algorithm for Automatic Speech Recognition," IEEE International Conference on Acoustics, Speech and Signal Processing (ICASSP), 2018, 5 pages.
Xu H., et al., "Neural Network Language Modeling with Letter-Based Features and Importance Sampling," IEEE International Conference on Acoustics, Speech and Signal Processing (ICASSP), 2018, pp. 6109-6113.
Xu J., et al., "Federated Learning for Healthcare Informatics," Journal of Healthcare Informatics Research, Nov. 12, 2020, pp. 1-19.

* cited by examiner

Algorithm 1: FL-based NNLM adaptation for ASR.

Hyper-parameters $K, \eta_l, \eta_g, \beta_1, \beta_2, \epsilon_g$;
Initialize $\theta_1$ as a pre-trained NNLM (no adaptation);
for each round $t = 1, 2, \ldots,$ do
    Deliver $\theta_t$ to each client
    Sample a subset $\mathcal{I}_t$ of clients
    for each client $i \in \mathcal{I}_t$ in parallel do
        $\theta_{i,1}^t := \theta_t$
        Load ASR transcripts on client $i$ for training
        for each local epoch $k = 1, 2, \ldots, K$ do
            Compute gradients $g_{i,k}^t$ on batches
            $\theta_{i,k+1}^t \leftarrow \text{SGD}(\theta_{i,k}^t, g_{i,k}^t; m)$
        end
        $\theta_i^t := \theta_{i,K+1}^t$
        Send $\Delta_i^t := \theta_t - \theta_i^t$ to server
    end
    $\theta_{t+1} \leftarrow \text{FedAdam}(\theta_t, \Delta_i^t, w_i^t, t, \eta_g, \beta_1, \beta_2, \epsilon_g)$
end

*FIG. 3*

PRIVATE LANGUAGE MODEL ADAPTATION FOR SPEECH RECOGNITION

PRIORITY

This application claims the benefit under 35 U.S.C. § 119(e) of U.S. Provisional Patent Application No. 63/249,159, filed 28 Sep. 2021, which is incorporated herein by reference.

TECHNICAL FIELD

This disclosure generally relates to machine-learning techniques, and in particular relates to adaptively training a language model.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for adapting a neural network language model (NNLM) to semantic and acoustic characteristics of a user associated with a client computing device. Automatic speech recognition (ASR) enables the recognition and translation of spoken language into text by computers. A hybrid-ASR system may comprise a feature extraction module, an acoustic model, an n-gram language model, and an NNLM. The feature extraction module may be the first logical entity of an ASR. The feature extraction module may convert an input audio/speech signal into a sequence of acoustic feature vectors, which are usually represented as mel-frequency cepstral coefficients (MFCCs) or by perceptual linear predictive (PLP) analysis. The acoustic model may establish statistical representations for the acoustic feature vectors. The n-gram language model may estimate a probability of a given word sequence. In particular, the n-gram language model may estimate a probability of a word's occurrence based on immediately preceding n-grams. The feature extraction module, the acoustic model, and the n-gram language model may produce one or more decoded hypotheses corresponding to an utterance. The NNLM may rescore sentence scores of the one or more decoded hypotheses corresponding to the utterance. The NNLM rescoring may be used to achieve improved performance in the hybrid-ASR system. The NNLM may be trained separately from the rest of the ASR. With the latest advances in mobile technologies, hosting an ASR system entirely on-device has important implications from a reliability, latency, and particularly privacy perspective. A common issue arising after deploying an ASR model on user devices may be the discrepancy between training data and actual data received on local devices. The semantic and acoustic characteristics of real users' speech could be significantly different from those of server-side proxy data, in which case speech model adaptation is indispensable. A privacy-preserving constraint may require user data to stay on their local devices. In such a case, performing model adaptation may be more challenging due to lack of ground truth transcription from users. To resolve this privacy concern, federated learning (FL), a distributed learning technique, has been proposed in ASR. FL can protect data privacy by training a shared model in a decentralized manner on users' local devices, so that raw data does not leave the local devices.

In particular embodiment, a first computing device may receive parameters of a first machine-learning model that is pre-trained on a server using a corpus of training data. The first machine-learning model may be an NNLM used for an ASR system. The first computing device may access a decoded hypothesis corresponding to an utterance. The decoded hypothesis may be generated by the ASR system based on speech of a user associated with the first computing device. The feature extraction module of the ASR system may convert the speech signals into a sequence of acoustic feature vectors. The ASR system may take the sequence of acoustic feature vectors as input and generate one or more decoded hypotheses using the acoustic model and the n-gram language model. The first machine-learning model may be used to rescore each of the one or more decoded hypotheses by computing a predicted probability of observing each token in the decoded hypothesis. The first computing device may compute a confidence score for each token in each of the one or more decoded hypotheses by having a second machine-learning model process information associated with the utterance including the decoded hypothesis. The information associated with the utterance may further comprise meta data associated with the utterance, acoustic model scores, language model scores, a length of the decoded hypothesis, or any suitable information. A confidence score may indicate a degree of confidence for the token to be correct. The second machine-learning model may be a pre-trained confidence classifier. The first computing device may calculate a loss for computed predicted probabilities of observing tokens in the decoded hypothesis based on the computed confidence scores. The loss may be a cross entropy loss. In particular embodiments, the computing device may apply token-level weights determined based on the computed confidence scores when the first computing device calculates the loss. In particular embodiments, the first computing device may apply an utterance-level weight determined by averaging confidence scores for the transcribed tokens corresponding to the utterance when the first computing device calculates the loss. The first computing device may update parameters of the local first machine-learning model based on the calculated loss. The first computing device may use a mini-batch stochastic gradient descent (SGD) as a local optimizer when updating the parameters of the local first machine-learning model.

In particular embodiments, the first computing device may send the updated parameters of the local first machine-learning model to the server. The server may update parameters of the global first machine-learning model based on the received updated parameters. The server may also update the parameters of the global first machine-learning model based on updated parameters of local first machine-learning models received from second computing devices. The server may use a FedAdam optimizer for updating the parameters of the global first machine-learning model. The server may apply a weight assigned to a second computing device when updating the parameters of the global first machine-learning model based on updated parameters received from the second computing device. The first computing device may receive the updated parameters of the global first machine-learning model from the server. The first computing device may update the parameters of the local first machine-learning model using the received updated parameters of the global first machine-learning model.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example pseudo code for an FL-based NNLM adaptation algorithm.

DESCRIPTION OF EXAMPLE EMBODIMENTS

Particular embodiments described herein relate to systems and methods for adapting a neural network language model (NNLM) to semantic and acoustic characteristics of a user associated with a client computing device. Automatic speech recognition (ASR) enables the recognition and translation of spoken language into text by computers. A hybrid-ASR system may comprise a feature extraction module, an acoustic model, an n-gram language model, and an NNLM. The feature extraction module may be the first logical entity of an ASR. The feature extraction module may convert an input audio/speech signal into a sequence of acoustic feature vectors, which are usually represented as mel-frequency cepstral coefficients (MFCCs) or by perceptual linear predictive (PLP) analysis. The acoustic model may establish statistical representations for the acoustic feature vectors. The n-gram language model may estimate a probability of a given word sequence. In particular, the n-gram language model may estimate a probability of a word's occurrence based on immediately preceding n-grams. The feature extraction module, the acoustic model, and the n-gram language model may produce one or more decoded hypotheses corresponding to an utterance. The NNLM may rescore sentence scores of the one or more decoded hypotheses corresponding to the utterance. The NNLM rescoring may be used to achieve improved performance in the hybrid-ASR system. The NNLM may be trained separately from the rest of the ASR. With the latest advances in mobile technologies, hosting an ASR system entirely on-device has important implications from a reliability, latency, and particularly privacy perspective. A common issue arising after deploying an ASR model on user devices may be the discrepancy between training data and actual data received on local devices. The semantic and acoustic characteristics of real users' speech could be significantly different from those of server-side proxy data, in which case speech model adaptation is indispensable. A privacy-preserving constraint may require user data to stay on their local devices. In such a case, performing model adaptation may be more challenging due to lack of ground truth transcription from users. To resolve this privacy concern, federated learning (FL), a distributed learning technique, has been proposed in ASR. FL can protect data privacy by training a shared model in a decentralized manner on users' local devices, so that raw data does not leave the local devices.

Figure 1:
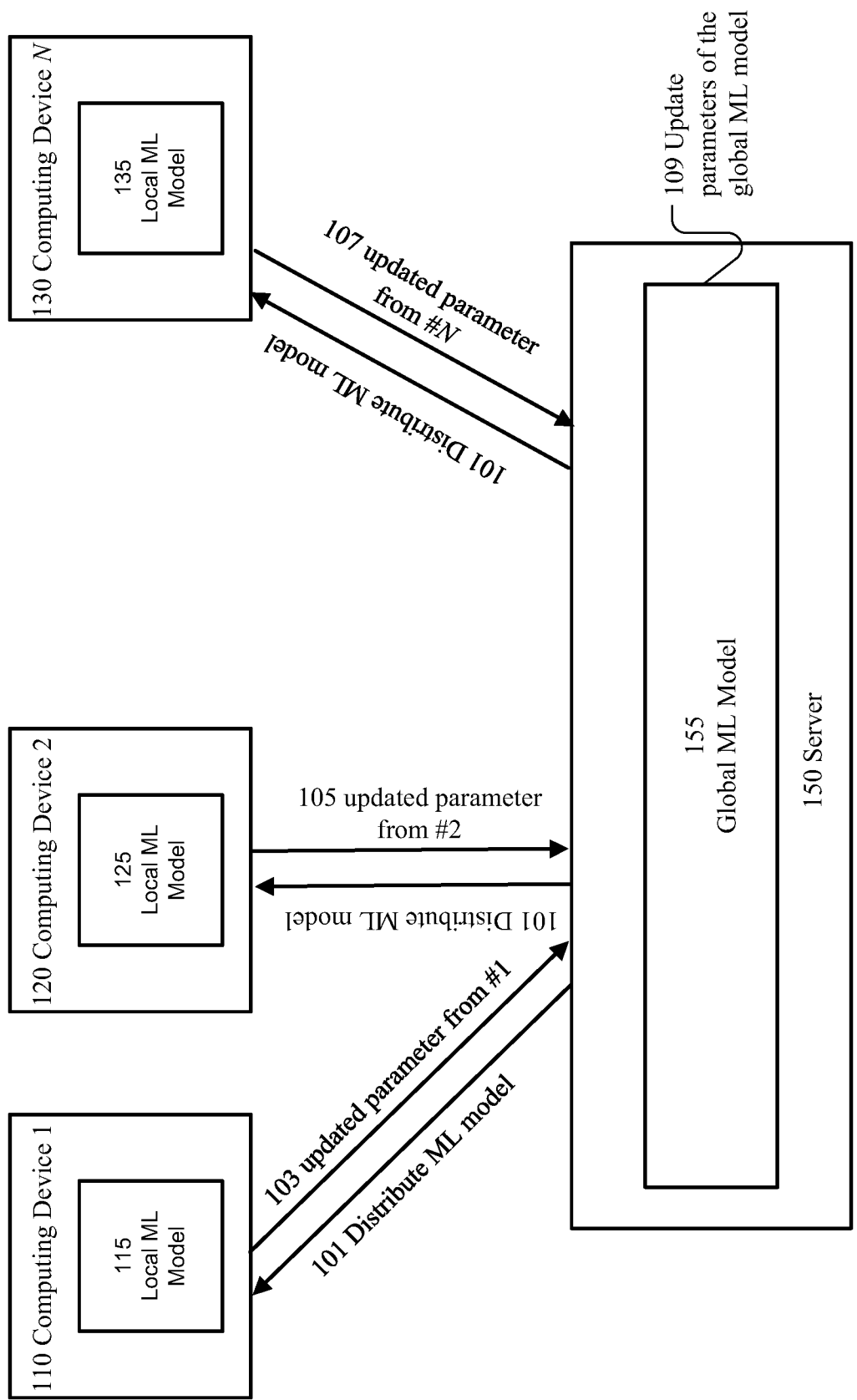
FIG. 1 illustrates an example FL of a machine-learning model.

FIG. 1 illustrates an example FL of a machine-learning model. A server 150 may train a global ML model 155 using a corpus of global training data. The server 150 may distribute copies of the trained global ML model 155 to computing devices 110, 120, and 130 at step 101. A first computing device 110 may deploy a first local ML model 115 based on the received copy of the global ML model 155. The first computing device 110 may train the first local ML model 115 using training data that is locally collected on the first computing device 110. At step 103, the first computing device 100 may send updated parameters of the first local ML model 115 due to the training to the server 150. A second computing device 120 may deploy a second local ML model 125 based on the received copy of the global ML model 155. The second computing device 120 may train the second local ML model 125 using training data that is locally collected on the second computing device 120. At step 105, the second computing device 120 may send updated parameters of the second local ML model due to the training to the server 150. Likewise, all the computing devices including $N^{th}$ computing device 130 may train their own local ML models including $N^{th}$ local ML model 135 using training data that is locally collected. At step 107, the $N^{th}$ computing device 130 may send updated parameters of the $N^{th}$ local ML model 135 due to the training to the server 150. At step 109, the server 150 may update parameters of the global ML model 155 based on the received parameters from the computing devices 110, 120, and 130. Although this disclosure describes performing a federated learning in a particular manner, this disclosure contemplates performing a federated learning in any suitable manner.

In particular embodiments, a first computing device 110 may receive parameters of a first machine-learning model 115 that is pre-trained on a server 150 using a corpus of training data. The first machine-learning model 115 may be an NNLM used for an ASR system. The first computing device 110 may access a decoded hypothesis corresponding to an utterance. The decoded hypothesis may be generated by the ASR system based on speech of a user associated with the first computing device 110. The feature extraction module of the ASR system may convert the speech signals into a sequence of acoustic feature vectors. The ASR system may take the sequence of acoustic feature vectors as input and generate one or more decoded hypotheses using the acoustic model and the n-gram language model. The first machine-learning model 115 may be used to rescore each of the one or more decoded hypotheses by computing a predicted probability of observing each token in the decoded hypothesis. The first computing device 110 may compute a confidence score for each token in each of the one or more decoded hypotheses by having a second machine-learning model process information associated with the utterance including the decoded hypothesis. The information associated with the utterance may further comprise meta data associated with the utterance, acoustic model scores, language model scores, a length of the decoded hypothesis, or any suitable information. A confidence score may indicate a degree of confidence for the transcribed token in the decoded hypothesis to be correct. The second machine-learning model may be a pre-trained confidence classifier. The first computing device 110 may calculate a loss for computed predicted probabilities of observing tokens in the decoded hypothesis based on the computed confidence scores. The loss may be a cross entropy loss. In particular embodiments, the first computing device 110 may apply token-level weights determined based on the computed confidence scores when the first computing device 110 calculates the loss. In particular embodiments, the first computing device 110 may apply an utterance-level weight determined by averaging confidence scores for the transcribed tokens corresponding to the utterance when the first computing device 110 calculates the loss. The first computing device 110 may update parameters of the local first machine-learning model 115 based on the calculated loss. The first computing device 110 may use a mini-batch stochastic gradient descent (SGD) as a local optimizer when updating the parameters of the local first machine-learning model 115. Although this disclosure describes training a local machine-learning model based on a locally collected set of utterances in a particular manner, this disclosure contemplates training a local machine-learning model based on a locally collected set of utterances in any suitable manner.

Figure 2:
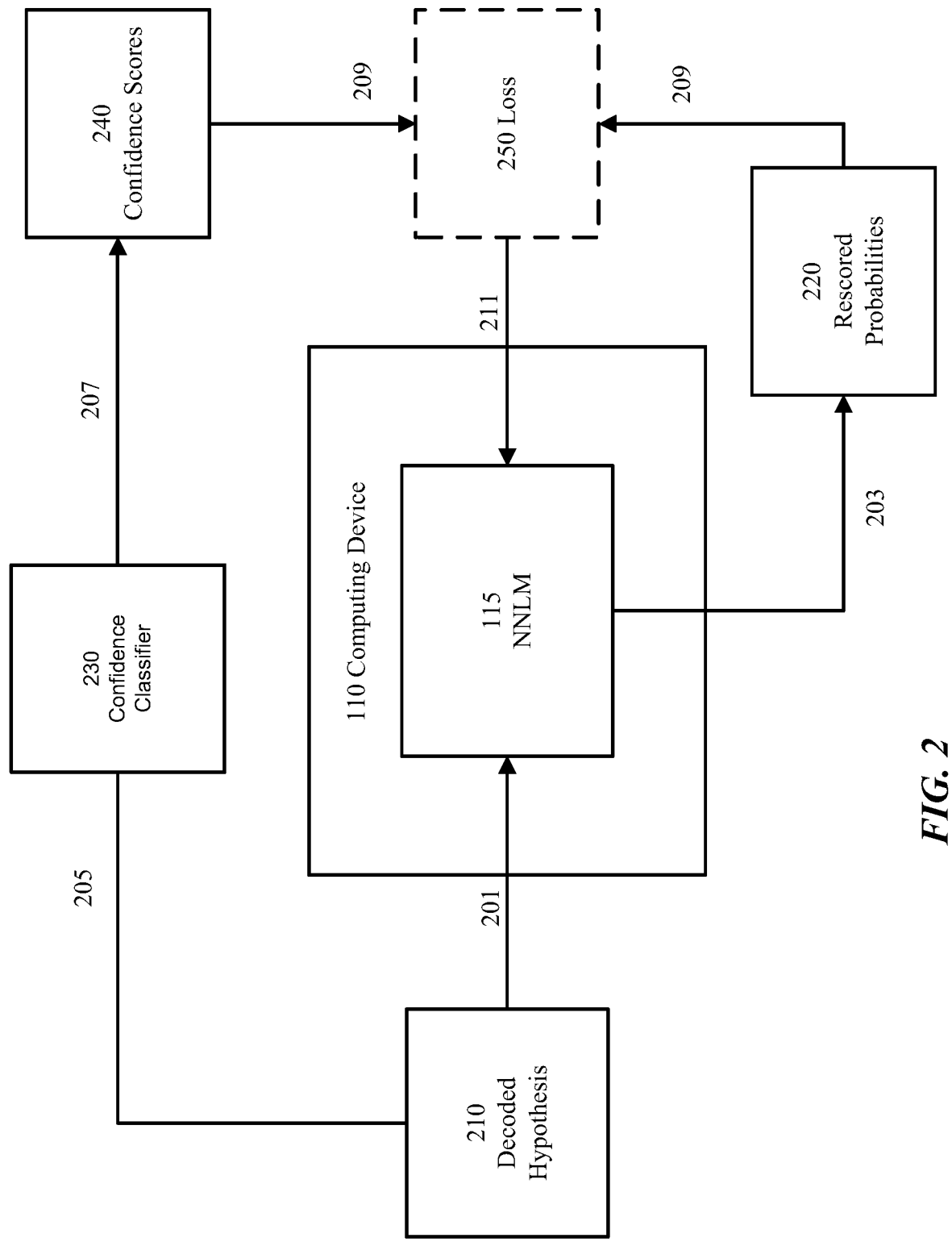
FIG. 2 illustrates an example architecture for training a locally deployed NNLM using locally collected training data.

FIG. 2 illustrates an example architecture for training a locally deployed NNLM using locally collected training data. The first computing device 110 may deploy a local NNLM 115 based on a copy of a global NNLM received from the server 150. The first computing device 110 may provide a decoded hypothesis 210 corresponding to an utterance to the local NNLM 115 as input at step 201. At step 203, the local NNLM 115 may compute a predicted probability of observing each token in the decoded hypothesis 210 to produce rescored probabilities 220 of the decoded hypothesis 210. At step 205, the first computing device 110 may provide information associated with the utterance including the decoded hypothesis 210 to a confidence classifier 230 as input. At step 207, the confidence classifier 230 may produce a confidence score 240 for each token in the decoded hypothesis 210. At step 209, the first computing device may calculate a loss 250 for the rescored probabilities 220 of the decoded hypothesis 210 based on their corresponding confidence scores 240. At step 211, the first computing device 110 may update parameters of the local NNLM 115 based on the calculated loss 250. Although this disclosure describes training a locally deployed NNLM using locally collected training data in a particular manner, this disclosure contemplates training a locally deployed NNLM using locally collected training data in any suitable manner.

In particular embodiments, a first computing device 110 may receive parameters of a first machine-learning model 115 that is pre-trained on a server 150 using a corpus of training data. The first machine-learning model 110 may be an NNLM used for an ASR system. As an example and not by way of limitation, a first computing device 110 may receive a copy of a global NNLM 155 from a server 150. The first computing device 110 may deploy a local NNLM 115 based on the received copy of the global NNLM 155. The server 150 may have trained the global NNLM 155 using a corpus of training data. The semantic and acoustic characteristics of a user associated with the first computing device 110 may be significantly different from those of server-side training data. Therefore, model adaptation may be required. The privacy-preserving constraint may require user data to stay on the local devices. Thus, performing model adaptation may be more challenging because no ground truth transcription from the user is available. Although this disclosure describes deploying a local NNLM for an ASR system in a particular manner, this disclosure contemplates deploying a local NNLM for an ASR system in any suitable manner.

In particular embodiments, the first computing device 110 may access a decoded hypothesis 210 corresponding to an utterance. The decoded hypothesis 210 may be generated by the ASR system based on speech of a user associated with the first computing device 110. As an example and not by way of limitation, the first computing device 110 may store one or more decoded hypotheses 210 whenever the user is using the ASR system on the first computing device 110. When the first computing device 110 determines that the NNLM adaptation procedure is needed, the first computing device 110 may start local training process. In a training epoch, training data may be split into multiple batches. For a sake of simplicity, a batch for a training epoch may be assumed to be an utterance. However, the disclosure contemplates any suitable data split for batches. Although this disclosure describes accessing training data for a local NNLM adaptation in a particular manner, this disclosure contemplates accessing training data for a local NNLM adaptation in any suitable manner.

In particular embodiments, the first computing device 110 may produce rescored probabilities 220 by computing a predicted probability of observing each token in the decoded hypothesis 210 using a local first machine-learning model 115. As an example and not by way of limitation, an utterance corresponding to $b^{th}$ batch of $k^{th}$ training epoch on the first computing device 110 may comprise $n_b$ sentences. When $t^{th}$ transcribed token in $j^{th}$ sentence is represented as $v^*_{j,t}$, the local NNLM 115 may, for the $b^{th}$ batch of $k^{th}$ training epoch, produce $v^*_{j,t}$ for $t=\{1, 2, \ldots, T_j\}$ and $j=\{1, 2, \ldots, n_b\}$, where $T_j$ represents a number of tokens in $j^{th}$ sentence. For a transcribed token $v^*_{j,t}$, a predicted probability of observing $v^*_{j,t}$ over the entire vocabulary may be represented as $\hat{p}_{j,t,v^*_{j,t}}$. Although this disclosure describes producing rescored probabilities for a decoded hypothesis using a local NNLM in a particular manner, this disclosure contemplates producing rescored probabilities for a decoded hypothesis using a local NNLM in any suitable manner.

In particular embodiments, the first computing device 110 may compute a confidence score 240 for each transcribed token in the decoded hypothesis 210 by having a second machine-learning model 230 process information associated with the utterance including the decoded hypothesis 210. The information associated with the utterance may further comprise meta data associated with the utterance, acoustic model scores, language model scores, a length of the decoded hypothesis, or any suitable information. A confidence score 240 may indicate a degree of confidence for the transcribed token in the decoded hypothesis 210 to be correct. The second machine-learning model 230 may be a pre-trained confidence classifier. As an example and not by way of limitation, the pre-trained confidence classifier 230 may produce a probability distribution for candidate tokens in a dictionary for each transcribed token. A probability for a candidate token identical to the transcribed token may be a confidence score indicating a degree of confidence for the transcribed token to be correct. In other words, the confidence score may indicate a probability for the transcribed token to be correct. For a transcribed token $v^*_{j,t}$, a corresponding confidence score may be represented as $\hat{c}_{j,t}$. Although this disclosure describes computing a confidence score for each transcribed token in the decoded hypothesis in a particular manner, this disclosure contemplates computing a confidence score for each transcribed token in the decoded hypothesis in any suitable manner.

In particular embodiments, the first computing device 110 may calculate a loss 250 for the rescored probabilities 220. The loss 250 may be a cross entropy loss. As an example and not by way of limitation, the loss 250 for the $b^{th}$ batch of $k^{th}$ training epoch may be calculated using $$\mathcal{L}_{k,b}(\theta) = -\frac{1}{n_b}\sum_{j=1}^{n_b}\frac{1}{T_j}\sum_{t=1}^{T_j}\log\left(\hat{p}_{j,t,v^*_{j,t}}(\theta)\right)$$

where $\theta$ represents a current parameters of the NNLM 115. Although this disclosure describes calculating a loss for rescored probabilities for a decoded hypothesis in a particular manner, this disclosure contemplates calculating a loss rescored probabilities for a decoded hypothesis in any suitable manner.

In particular embodiments, the first computing device 110 may calculate a modified loss 250 based on the computed confidence scores 240. In particular embodiments, the first computing device 110 may apply token-level weights determined based on the computed confidence scores when the first computing device 110 calculates the loss 250. The token-level-weighted loss $\mathcal{L}_{k,b}^{token-weight}(\theta)$ may be computed as $$\mathcal{L}_{k,b}^{token-weight}(\theta) = -\frac{1}{n_b}\sum_{j=1}^{n_b}\frac{1}{T_j}\sum_{t=1}^{T_j}\hat{c}_{j,t}\log\left(\hat{p}_{j,t,v^*_{j,t}}(\theta)\right)$$

where $\hat{c}_{j,t}$ represents an estimated confidence score on the transcribed token $v^*_{j,t}$. Although this disclosure describes calculating a token-level-weighted loss in a particular manner, this disclosure contemplates calculating a token-level-weighted loss in any suitable manner.

In particular embodiments, the first computing device 110 may apply an utterance-level weight determined by averaging confidence scores for the transcribed tokens corresponding to the utterance when the first computing device 110 calculates the loss. The utterance-level confidence score $\hat{c}_j$ may be calculated as $$\hat{c}_j := \sum_{t=1}^{T_j}\frac{\hat{c}_{j,t}}{T_j}.$$

The utterance-level-weighted loss $\mathcal{L}_{k,b}^{token-weight}(\theta)$ may be computed as:

$$\mathcal{L}_{k,b}^{utt-weight}(\theta) = -\frac{1}{n_b}\sum_{j=1}^{n_b}\frac{\hat{c}_j}{T_j}\sum_{t=1}^{T_j}\log\left(\hat{p}_{j,t,v^*_{j,t}}(\theta)\right)$$

where $\hat{c}_j$ represents an estimated utterance-level confidence score. Although this disclosure describes calculating an utterance-level-weighted loss in a particular manner, this disclosure contemplates calculating an utterance-level-weighted loss in any suitable manner.

In particular embodiments, the first computing device 110 may apply a hard thresholding when selecting local training data. The first computing device 110 may exclude a set of utterances $\{j \in [n_b]: \hat{c}_j < c\}$ from training data, where c is a fixed constant. Although this disclosure describes excluding utterances from training data based on their utterance-level confidence scores in a particular manner, this disclosure contemplates excluding utterances from training data based on their utterance-level confidence scores in any suitable manner.

In particular embodiments, the first computing device 110 may update parameters of the local first machine-learning model 115 based on the calculated loss. The first computing device 110 may use a mini-batch stochastic gradient descent (SGD) as a local optimizer when updating the parameters of the local first machine-learning model 115. The first computing device 110 may compute gradients for the $b^{th}$ batch of $k^{th}$ training epoch $g_{k,b}(\theta_{k,b})$ based on the computed loss 250 $\mathcal{L}_{k,b}(\theta_{k,b})$. The first computing device 110 may update the local NNLM 115 as:

$$\theta_{k,b+1} = \theta_{k,b} - \eta_l g_{k,b}(\theta_{k,b})$$

where $\eta_l$ is a local learning rate. Although this disclosure describes updating parameters of the local first machine-learning model in a particular manner, this disclosure contemplates updating parameters of the local first machine-learning model in any suitable manner.

In particular embodiments, the first computing device 110 may send the updated parameters of the local first machine-learning model 115 to the server 150. The server 150 may update parameters of the global first machine-learning model 155 based on the received updated parameters. The server 150 may also update the parameters of the global first machine-learning model 155 based on updated parameters of local first machine-learning models 125, 135 received from second computing devices 120, 130. The server 150 may use a FedAdam optimizer for updating the parameters of the global first machine-learning model 155. The server 150 may apply a weight assigned to a second computing device 120 when updating the parameters of the global first machine-learning model 155 based on updated parameters received from the second computing device 120. The first computing device 110 may receive the updated parameters of the global first machine-learning model 155 from the server 150. The first computing device 110 may update the parameters of the local first machine-learning model 115 using the received updated parameters of the global first machine-learning model 155. Although this disclosure describes a federated learning procedure in a particular manner, this disclosure contemplates a federated learning procedure in any suitable manner.

FIG. 3 illustrates an example pseudo code for an FL-based NNLM adaptation algorithm. Initially, the server 150 may initialize a global NNLM 155 as a pre-trained NNLM without any adaptation. At each round, the server 150 may deliver copies of the global NNLM 155 to each computing device 110, 120, and 130. The computing devices 110, 120, and 130 may train the local NNLM 115, 125, and 135 using local training data. The computing devices 110, 120, and 130 may send their updated parameters of the local NNLMs 115, 125, and 135 due to the respective trainings to the server 150. The server may update the parameters of the global NNLM 155 using the FedAdam optimizer. The rounds may be repeated until a pre-determined condition is met. Although this disclosure describes an algorithm for an FL-based NNLM adaptation in a particular manner, this disclosure contemplates an algorithm for FL-based NNLM adaptation in any suitable manner.

In particular embodiments, the first computing device 110 may send the updated parameters of the local first machine-learning model 115 to the server 150 after training the local first machine-learning model until a pre-determined condition is met. In particular embodiments, the first computing device 110 may send entire parameters of the local first machine-learning model 115 to the server 150 instead of the updated parameters. In particular embodiments, the pre-determined condition may be associated with the loss being less than a pre-determined value. In particular embodiments, the pre-determined condition may be associated with a pre-determined number of training epochs. In particular embodiments, the first computing device 110 may send the updated parameters of the local first machine-learning model 115 to the server 150 only when the first computing device 110 receives an explicit request from the server 150. The server 150 may send requests to a selected subset of the computing devices 110, 120, and 130. Although this disclosure describes sending the updated parameters of the local machine-learning model after training the local machine-learning model in a particular manner, this disclosure contemplates sending the updated parameters of the local machine-learning model after training the local machine-learning model in any suitable manner.

In particular embodiments, the server 150 may update parameters of the global first machine-learning model 155 based on the received updated parameters from the first computing device 110. The server 150 may also update the parameters of the global first machine-learning model 155 based on updated parameters of local first machine-learning models received from second computing devices 120 and 130. The server may use a FedAdam optimizer for updating the parameters of the global first machine-learning model. The server 150 may apply a weight assigned to a computing device when updating the parameters of the global first machine-learning model based on updated parameters received from the computing device. As an example and not by way of limitation, the server 150 may sample a set $l_x$ of computing devices at round x. $\theta_i^x$ may represent a local NNLM model of computing device $i \in l_x$ after local training at round x. $\Delta_i^x := \theta_x - \theta_i^x$ of may represent updated parameters of the local NNLM of the computing device i that is sent back to the server 150 at the end of round x $$\Delta_x := \frac{\sum_{i \in l_x} w_i^x \Delta_i^x}{\sum_{i \in l_x} w_i^x},$$

where $w_i^x$ may refer to a weight assigned to the computing device i in the aggregation, may be an averaged model difference or 'pseudo-gradient' which may be used in general server optimizer updates. $w_i^x$ may be associated with a number of words in the training data for adapting the local NNLM in computing device i at the round x. The FedAdam optimizer may be used for updating the global NNLM. Although this disclosure describes updating parameters of a global machine-learning model based on the received updated parameters from the computing devices in a particular manner, this disclosure contemplates updating parameters of a global machine-learning model based on the received updated parameters from the computing devices in any suitable manner.

In particular embodiments, the first computing device 110 may receive the updated parameters of the global first machine-learning model 155 from the server 150. The first computing device 110 may update the parameters of the local first machine-learning model 115 using the received updated parameters of the global first machine-learning model 155. As an example and not by way of limitation, after updating the parameters of the global NNLM 155 at round x, the server 150 may distribute copies of the global NNLM 155 to the computing devices 110,120, and 130. The computing devices 110, 120, and 130 may update parameters of their local NNLM with the received parameters. Although this disclosure describes updating parameters of local machine-learning model in a particular manner, this disclosure contemplates updating parameters of local machine-learning model in any suitable manner.

Figure 4:
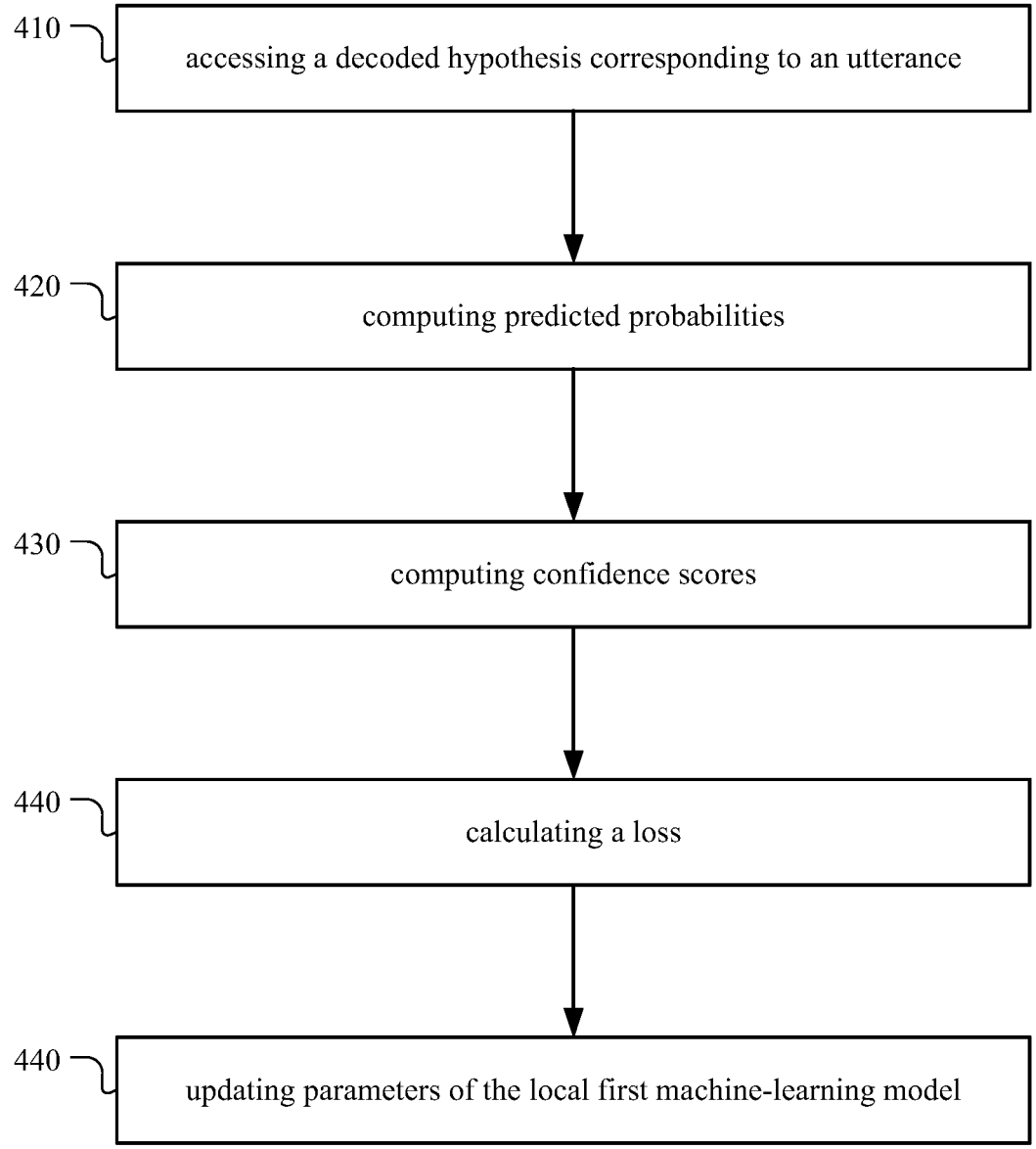
FIG. 4 illustrates an example method for adapting a local NNLM using locally collected training data.

FIG. 4 illustrates an example method 400 for adapting a local NNLM using locally collected training data. The method may begin at step 410, where the computing device 110 may access a decoded hypothesis corresponding to an utterance. At step 420, the computing device 110 may compute a predicted probability of observing each token in the decoded hypothesis by having a local first machine-learning model process the decoded hypothesis corresponding to the utterance. At step 430, the computing device 110 may compute a confidence score for each token in the decoded hypothesis by having a second machine-learning model process the decoded hypothesis. The confidence score may indicate a degree of confidence for the token to be observed at its position. At step 440, the computing device 110 may calculate a loss for the computed predicted probabilities of observing tokens in the decoded hypothesis based on the computed confidence scores. At step 450, the computing device 110 may update parameters of the local first machine-learning model based on the calculated loss. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for adapting a local NNLM using locally collected training data including the particular steps of the method of FIG. 4, this disclosure contemplates any suitable method for adapting a local NNLM using locally collected training data including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Artificial Neural Networks

Figure 5:
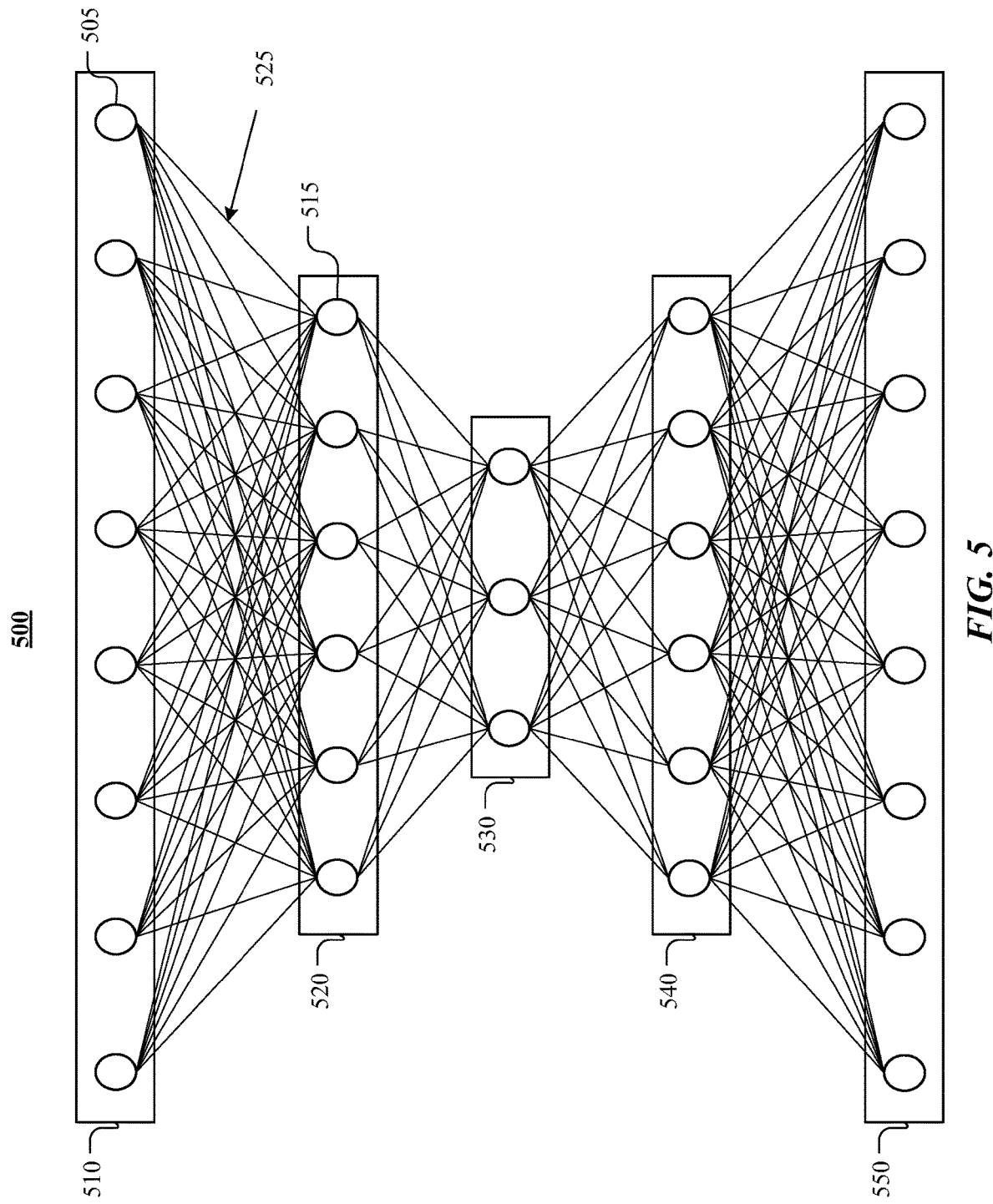
FIG. 5 illustrates an example artificial neural network.

FIG. 5 illustrates an example artificial neural network ("ANN") 500. In particular embodiments, an ANN may refer to a computational model comprising one or more nodes. Example ANN 500 may comprise an input layer 510, hidden layers 520, 530, 540, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F (x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k}-e^{-s_k}}{e^{s_k}+e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 6:
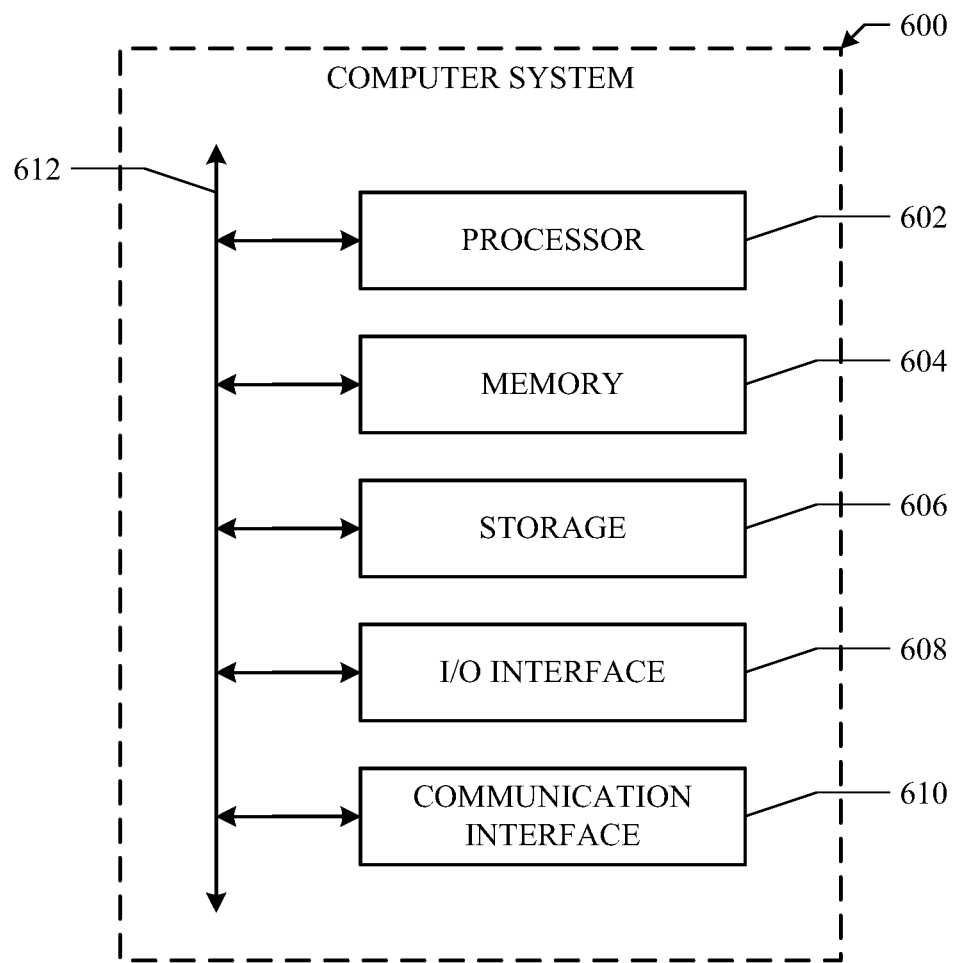
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first computing device:
   accessing a decoded hypothesis corresponding to an utterance;
   computing a predicted probability of observing tokens in the decoded hypothesis by having a local first machine-learning model process the decoded hypothesis;
   computing, for the tokens in the decoded hypothesis, confidence scores by having a second machine-learning model process the decoded hypothesis, wherein the confidence scores indicate a degree of confidence for the tokens to be observed at their position;
   calculating a loss for the computed predicted probabilities of observing tokens in the decoded hypothesis based on the computed confidence scores; and
   updating parameters of the local first machine-learning model based on the calculated loss.

2. The method of claim 1, wherein the local first machine-learning model is a neural network language model (NNLM) used for an automatic speech recognition (ASR) system.

3. The method of claim 1, wherein the local first machine-learning model is a copy of a global first machine-learning model that is pre-trained on a server using a corpus of training data.

4. The method of claim 3, further comprising:
   sending the updated parameters of the local first machine-learning model to the server, wherein the server updates other parameters of the global first machine-learning model based on the updated parameters.

5. The method of claim 4, wherein the server updates the other parameters of the global first machine-learning model based on one or more updated parameters of local first machine-learning models received from second computing devices.

6. The method of claim 5, wherein a FedAdam optimizer is used for updating the parameters of the global first machine-learning model.

7. The method of claim 5, wherein the server applies a weight assigned to a computing device when updating the parameters of the global first machine-learning model based on updated parameters received from the computing device.

8. The method of claim 5, further comprising:
   receiving, from the server, the updated parameters of the global first machine-learning model; and
   updating the parameters of the local first machine-learning model using the received updated parameters of the global first machine-learning model.

9. The method of claim 1, wherein the decoded hypothesis corresponding to the utterance is generated by an automatic speech recognition (ASR) based on acoustic feature vectors extracted from speech of a user associated with the first computing device.

10. The method of claim 1, wherein the loss is a cross entropy loss.

11. The method of claim 10, wherein token-level weights determined based on the computed confidence scores are applied when the loss is calculated.

12. The method of claim 10, wherein an utterance-level weight determined by averaging confidence scores for transcribed tokens corresponding to the utterance is applied when the loss is calculated.

13. The method of claim 1, wherein a mini-batch stochastic gradient descent (SGD) is used as a local optimizer when updating the parameters of the local first machine-learning model.

14. The method of claim 1, wherein the second machine-learning model is a pre-trained confidence classifier.

15. One or more computer-readable non-transitory storage media embodying software that is operable when executed to:
   access a decoded hypothesis corresponding to an utterance;
   compute a predicted probability of observing tokens in the decoded hypothesis by having a local first machine-learning model process the decoded hypothesis;
   compute, for the tokens in the decoded hypothesis, confidence scores by having a second machine-learning model process a sequence of transcribed tokens, wherein the confidence scores indicate a degree of confidence for the tokens to be observed at their position;
   calculate a loss for the computed predicted probabilities of observing the tokens in the decoded hypothesis based on the computed confidence scores; and
   update parameters of the local first machine-learning model based on the calculated loss.

16. The media of claim 15, wherein the local first machine-learning model is a neural network language model (NNLM) used for an automatic speech recognition (ASR) system.

17. The media of claim 15, wherein the local first machine-learning model is a copy of a global first machine-learning model that is pre-trained on a server using a corpus of training data.

18. The media of claim 17, wherein the software is further operable when executed to:
   send the updated parameters of the local first machine-learning model to the server, wherein the server updates parameters of the global first machine-learning model based on the updated parameters of the local first machine-learning model.

19. The media of claim 18, wherein the server updates the parameters of the global first machine-learning model based on other updated parameters of local first machine-learning models received from second computing devices.

20. A system comprising: one or more processors; and a non-transitory memory coupled to the one or more processors comprising instructions executable by the one or more processors, the one or more processors operable when executing the instructions to:
   access a decoded hypothesis corresponding to an utterance;
   compute a predicted probability of observing the tokens in the decoded hypothesis by having a local first machine-learning model process the decoded hypothesis;
   compute, for the tokens in the decoded hypothesis, confidence scores by having a second machine-learning model process the sequence of transcribed tokens, wherein the confidence scores indicate a degree of confidence for the tokens to be observed at their position;
   calculate a loss for the computed predicted probabilities of observing the tokens in the decoded hypothesis based on the computed confidence scores; and
   update parameters of the local first machine-learning model based on the calculated loss.

* * * * *